United States Patent [19]

Parker et al.

[11] Patent Number: 4,935,300

[45] Date of Patent: Jun. 19, 1990

[54] HEAT TRANSFERABLE LAMINATE

[75] Inventors: Tim Parker, Shrewsbury; Frank A. Magnotta, Framingham, both of Mass.; Jean-Paul Laprade, Woonsocket, R.I.; Donald R. Smith, Hingham; John M. Anemaet, Millis, both of Mass.; Dennis R. Benoit, Woonsocket, R.I.; Earl K. Thornton, Jr., Andover, Mass.

[73] Assignee: Dennison Manufacturing Company, Framingham, Mass.

[21] Appl. No.: 181,090

[22] Filed: Apr. 13, 1988

[51] Int. Cl.[5] .................... C09J 7/02

[52] U.S. Cl. .................... 428/352; 428/40; 428/349; 428/914; 428/913; 428/481; 428/511

[58] Field of Search .................... 428/914, 913, 349, 40, 428/352, 511, 481

[56] References Cited

U.S. PATENT DOCUMENTS 3,922,435 11/1975 Asnes .................... 428/349

4,704,310 11/1987 Tighe et al. .................... 428/914

*Primary Examiner*—Edith Buffalow

*Attorney, Agent, or Firm*—Barry D. Josephs

[57] ABSTRACT

An improved release system for heat transferable laminates wherein a transferable substrate which contains a design layer is transferred from a carrier web onto an article such as a plastic bottle or container upon application of heat and pressure. The carrier web includes a nonwax polyethylene layer.

The improved release system includes a polyethylene layer portion of the carrier web in contact with and adhered to a nonwax transfer layer portion of the transferable substrate. The transferable substrate including the ink design layer transfers to the article upon application of heat to the carrier while the article contacts the laminate. The transferred substrate on the article is clear and exhibits improved scuff and abrasion resistance. The nonwax transfer layer portion of the transferable substrate advantageously contains an oil which becomes activated upon application of heat to promote release of the transferable substrate from the carrier web to the article.

16 Claims, 1 Drawing Sheet

HEAT TRANSFERABLE LAMINATE

BACKGROUND OF THE INVENTION

1. Field of the Invention

The present invention relates to a heat transferable label and improved release composition therefor.

2. Description of the Prior Art

Prior art heat transferable labels for imprinting designs onto an article typically involve decorative laminates consisting of a paper base sheet or carrier web coated with a wax or polymeric release layer over which a design is imprinted in ink.

U.S. Pat. No. 3,616,015 (Kingston) is illustrative of the prior art. In U.S. Pat. No. 3,616,015 a label-carrying web, such as a paper sheet, includes a heat transferable label having a wax release layer affixed to a surface of the paper sheet and an ink design layer superimposed onto the wax release layer. In the heat transfer labeling process for imprinting designs onto articles, the label carrying web is subjected to heat and the laminate is pressed onto an article with the ink design layer making direct contact with the article. As the web or paper sheet is subjected to heat the wax layer begins to melt and allows the design layer to transfer to the arcticle. A portion of the wax release transfers to the article along with the design image. After transfer of the design to the article, the paper sheet is immediately removed leaving the design firmly affixed to the surface of the article with the wax layer exposed to the environment thereon. The wax layer thus serves two purposes in that provides release of the transferable label from the web upon application of heat to the web and also forms a clear protective layer over the transferred ink design. After transfer of the label to an article, the transferred wax release layer is typically subjected to post-flaming which produces an optically clear protective layer over the ink design and enhances the protective properties of the transferred wax release.

The additional step involving post-flaming is accomplished by subjecting the transferred wax layer to jets of high temperature gas either as direct gas flame or as hot air jets to produce wax surface temperatures of about 300° to 400° F. for a period of time sufficient to remelt the wax coating without substantially heating the article to which the label has been transferred. Upon cooling of the remelted wax coating through use of ambient or forced-cooled air, the cooled wax layer solidifies to form a clear, smooth protective coating over the ink design.

Although the heat transferable label disclosed in this reference may be utilized for decorating a wide variety of different articles, typically plastic bottles, there is a degree of hazing or "halo" noticable over the transferred label when the transfer is made onto clear plastic materials, despite use of post-flaming. The "halo" effect is caused by transfer of a portion of the wax release layer from the paper carrying sheet and onto the article along with the ink design layer. Although the transferred wax layer has the beneficial effect of providing a protective coating over the transferred ink design, the nature of the wax coating is such that it provides some halo around the outer borders of the transferred ink design layer. Although wax based release layers have produced optically clear protective layers over the ink design and provide a high degree of protection for the transferred ink design, they are nonetheless subject to scuffing and abrasion because of the inherent nature of the wax material.

U.S. Pat. No. 3,922,435 (Asnes) discloses a heat transferable label which is directed to replacing the wax based release layer with a non-wax resin thus avoiding the "halo" effect long associated with the use of wax based compositions. Asnes refers to this type of release layer as a dry release since it does not transfer to the article along with the ink design layer when heat is applied to the heat transferable laminate as the laminate is in contact with the article. In a preferred embodiment this reference discloses a dry release layer composed of a thermoset polymeric resin to impart to the layer in which it is present a softening temperature substantially greater than the temperature of the dry release transfer temperature, which is typically about 300° to 450° F., as disclosed in this reference. Preferred thermoset resins for the dry release layer disclosed in this reference are cross linked resins selected from the group consisting of acrylic resins, polyamide resins, polyester resins, vinyl resins and epoxy resins. The release layer, preferably composed of a thermoset resin, is overcoated with a lacquer layer which is in turn coated with the design print and then an adhesive overlayer. This reference teaches that the lacquer layer over the dry release layer also should have a softening temperature above the dry release heat transfer temperatures. (Col. 5, lines 58–60).

Although this reference is directed to use of thermoset resins for the dry release layer, the reference does state that certain thermoplastic resins, such as polypropylene can be used for the release layer so long as they have a softening temperature well above the temperature of the dry release transfer heat, that is, well above the range between 300° to 450° F. (See Col. 4, lines 49–53). In this connection this reference teaches that the use of polyethylene for the dry release composition has proved to be unsuitable. Asnes states that polyethylene "tend(s) to soften under heat transfer conditions, e.g., 300° F.–450° F., more usually 325°–400° F., required for commercially practical dry release heat transfer. This reduces the cohesion thereof and increases the adhesion thereof to the lacquer layer. As a result, during stripping, some of the polyethylene . . . is apt to be removed at least in some areas with the lacquer layer and design print, which remain adhered to the transferred surface by the heat activated adhesive, i.e., the cohesion of the resinous release layer is apt to be reduced at least in certain areas below the increased adhesion in those areas between the release layer and lacquer layer, and as a result, the break between the release and lacquer layers is not dependably and uniformly clean." (Col. 1, line 64 to Col. 2. line 10). This is a clear teaching against use of polyethylene as a composition for the dry release layer.

This well documented problem associated with the use of polyethylene for the release layer has long discouraged investigators in the art in attempting to employ polyethylene as a dry release composition for use in heat transferable labels wherein the required hot platen temperatures are in the conventional range between 300° F. to 450° F. It should be noted that this range of required platen temperature has in measure been set by the availability and use of conventional heat activatable adhesives which are used to overcoat the ink design layer or included in the ink design layer. Conventional heat activatable adhesives, which have been found to be suitable for use in this technology have required a platen temperature heat source in the range between about 300° F. to 450° F. The teaching of this reference is that when subjected to the required heat between 300° F. to 450° F. to effect label transfer, the polyethylene becomes instantly more adhesive and less cohesive, thus preventing attainment of a uniformly clean release. This is a clear teaching against the use of polyethylene for the release composition. These teachings are representative of this long standing problem associated with the use of polyethylene as the dry release composition in applicant's art. Such teachings discourage the use of polyethylene as a dry release composition for commercially acceptable heat transfer labels.

Accordingly, it is an object of the present invention to provide and improve nonwax based release system for heat transferable laminates which permits transfer of an ink design image from a carrier web to an article, in particular to a plastic article.

It is an important object to provide a release system which provides a protective coating over the transfer ink design image such that the transferred image shows improved resistance to abrasion and scuffing while maintaining a high degree of optical clarity.

It is a further object to provide an improved release system and heat transferable laminate for use in transfer of a design image from a carrier web to a plastic article wherein the problem of wax "halo" around the transferred image has been eliminated. A related object is to provide an improved release system for heat transferable laminates which provides a protective coating for the transferred image which is also resistant to common solvents.

SUMMARY OF THE INVENTION

In accomplishing the foregoing and related objects the invention provides a heat transferable laminate having an improved release system. The heat transferable laminate of the invention includes a carrier sheet typically of paper and a transferable substrate affixed to the carrier sheet. The carrier sheet includes a nonwax release layer coated or extruded over the paper sheet. The nonwax release layer is advantageously polyethylene. The transferable substrate is formed of a nonwax lacquer transfer layer, an ink design layer over the lacquer coating transfer layer and a heat activatable adhesive layer over the ink design layer. The transferable substrate is formed by coating each one of these layers in turn beginning with the lacquer coating transfer layer over the polyethylene release layer of the carrier web to form a composite laminate.

The preferred release system of the invention is composed of the polyethylene release layer of the carrier and the lacquer transfer layer of the transferable substrate. The polyethylene release layer and the lacquer coating transfer layer are in direct contact with each other. As heat and pressure are applied by a heat source to the composite laminate in contact with an article such as a plastic container, the transferable substrate releases cleanly from the polyethylene release layer of the carrier and transfers to the article, typically a plastic bottle or container being decorated. The heat source applied is typically a heated metal platen or heated platen roller having a surface temperature between about 275° F. to 425° F. The release system of the invention has the property that on application of the heat source to the exposed side of the carrier sheet while the transferable substrate is in contact with an article, the transferable substrate releases cleanly from the carrier to the article without taking with it any discernible portion of the polyethylene release layer. The resulting transferred substrate on the article shows a clear transferred design image adhered permanently to the article. The transferred design image is protected by the lacquer coating transfer layer which also transferred to the article. The transferred lacquer coating layer covers the design image and provides a clear protective coating which affords markedly improved abrasion and scuff resistance for the transferred design image. The degree of abrasion resistance afforded by the transferred lacquer coating is greater than what has heretofor been achieved by use of a wax based release in contact with the carrier. The tough protective coating also exhibits excellent resistance to attack by household alcohols and common solvents often found in cosmetics and toiletries.

The present release system of the invention has the additional advantage over wax based release systems in that it eliminates the wax "halo" effect around the borders of the transferred design image. The wax "halo" effect eliminated by the present release system of the invention has been long associated with wax based release formulations.

It should be recognized that copolymers of ethylene which exhibit the same similar properties as polyethylene with respect to softening temperature range, cohesive strength and change in physical properties as it begins to soften may be employed in place of pure polyethylene. Such copolymers typically have as their major constituent, e.g., greater than 50% by weight ethylene copolymer. Thus, "polyethylene" as used herein, and in the claims is intended to be construed as including such equivalents. It has been determined that the addition of certain oils, surfactants and slip agents such as erucimide and oleic acid may be blended into the polyethylene release layer 5 to also enhance its release properties on transfer.

The polyethylene release layer on the carrier sheet may be low, medium or high density polyethylene or blends thereof, preferably high density or medium density polyethylene, more preferably high density polyethylene.

It has also been determined that the polyethylene release layer may be composed of blends of low, medium and high density polyethylene. It has also been determined that the polyethylene release layer may be composed of the newer type polyethylenes such as ultra or very low density polyethylene and linear low polyethylene or blends thereof. These newer type polyethylenes may also be blended in with the the traditional low, medium or high density polyethylenes.

The lacquer coating transfer layer coated onto the polyethylene release layer is formed of a polymeric resin matrix and advantageously a relatively small amounts of a nondrying oil. A preferred nondrying oil is a nondrying vegetable oil, for example, of the castor oil type. The resin matrix of the lacquer coating transfer layer is preferably composed of a polyester resin or acrylic resin having the properties that it adequately adheres to the polyethylene release layer at ambient temperature but tends to be incompatible with polyethylene in physical admixture therewith. These resins, in general, must be transparent, chemically inert, heat stable at transfer temperatures and advantageously does not begin to soften at the desired heat transfer temperatures.

A preferred resin matrix for the lacquer coating saturated transfer layer has been found to be the polyester which is a linear aromatic polyester, preferably a modified polyethylene terephthalate. The lacquer coating transfer layer is prepared by admixing the resin binder and the nondrying vegetable oil in conventional solvent systems at ambient temperature until a homogeneous solution is achieved. The lacquer transfer coating is printed onto the polyethylene release layer by conventional application techniques typically by gravure coating. The lacquer transfer layer is then subjected to convective drying to evaporate the solvents thus leaving a dry transfer coating layer over and in contact with the polyethylene release layer of the carrier. The amount of oil in the dried lacquer coating layer is relatively small and typically is present in amounts between 1.0 to 15 percent by weight of the dried lacquer coating.

It is theorized that as the required level of heat is applied, typically by hot rubber roller or metal platen in contact with the exposed side of the carrier web while the transferable laminate is in contact with the article being decorated, the nondrying oil molecules in the lacquer coating transfer layer immediately become activated and instantly migrate to the interfacial surface between the polyethylene release layer and the lacquer coating layer. This phenonomon is believed to promote an instantaneous lubricating effect between the lacquer coating transfer layer and the polyethylene layer, which overcomes the increase in adhesiveness and tack of the polyethylene layer as it is subjected to the heat source. This unexpectedly results in a clean and immediate separation of the transferable substrate from the carrier. Upon transfer, the lacquer coating transfer layer separates instantaneously and cleanly from the polyethylene release layer of the carrier without taking any portion of the polyethylene release layer with it. Also upon transfer, no discernible portion of the lacquer transfer layer is left behind on the polyethylene layer. This results in a highly desirable clean and instantaneous transfer of the transferable substrate to the article.

DETAILED DESCRIPTION

Figure 1:
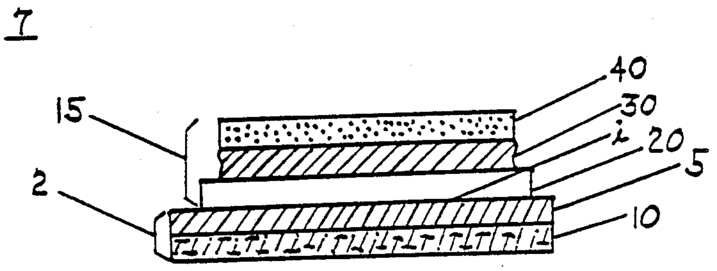
FIG. 1 is an illustration of a preferred embodiment of the composite heat transferable laminate.

A preferred embodiment of the heat transferable laminate 7 of the invention, as illustrated in FIG. 1, is composed of a carrier web 2 and a transferable substrate 15. The carrier web is composed of a support sheet 10, typically of paper overcoated with a nonwax release layer 5. The nonwax release layer 5 is advantageously polyethylene. The transferable substrate 15 as shown in FIG. 1 is composed of a lacquer transfer coating 20 which is overcoated with an ink design layer 30 which is in turn overcoated with an heat-activatable adhesive layer 40.

As heat from a hot platen or hot platen roller is applied to the exposed side of support sheet 10 while the adhesive layer 40 of laminate 7 comes into contact with a bottle or article to be decorated, transferable substrate 15 separates cleanly from carrier web 2 and transfers onto the article.

The transferable laminate 7 of the invention has the property that the transferable substrate 15, during transfer to the article, separates cleanly from polyethylene release layer 5 without taking with it any portion of release layer 5. This result is achieved with application of heated platen (not shown) to the exposed side of support sheet 10 wherein the heated platen has an average surface temperature of between about 275° F. to 425° F., preferably between about 300° F. to about 425° F. The term "wax" as used herein shall have its normal dictionary definition as in G. Hawley, The Condensed Chemical Dictionary, Tenth Edition, Van Nostrand Reinhold Co.

The polyethylene release layer 5 is a nonwax layer in that it does not contain waxes.

The polyethylene release layer 5 may be low, medium or high density polyethylene but is preferrably medium or high density polyethylene, more preferably high density polyethylene. The polyethylene preferably should not be corona treated. High density polyethylene, is known to have a VICAT softening temperature well below the low end of applicant's typical hot platen temperature range of between 300° F. to 425° F. Low density and medium density polyethylene also have a VICAT softening temperature well below the typical hot platen temperature range of 300° F. to 425° F. Even if the hot platen temperature is as low as 275° F., high density polyethylene, medium density polyethylene and low density polyethylene or blends thereof each have VICAT softening temperature below such platen temperature. Since polyethylene is known to become adhesive or tacky as it approaches its softening temperature, applicants believe that the achievement of a clean separation of transferable substrate 15 at typical hot platen temperatures between 300° F. and 425° F. is wholly unexpected. At typical hot platen temperatures in a range between 300° F. to 425° F. and at typical decoration speeds of 60 transfers per minute, the label temperature, i.e., the polyethylene layer 5 temperature may typically be about 250° F. and higher as measured with an infrared pyrometer. These label temperatures are within or above the VICAT softening temperature range of even high density polyethylenes. It was unexpected that clean release of transferable substrate 15 from carrier web 2 within the aforestated hot platen temperature range could be achieved without taking any portion of the polyethylene layer 5 along with transferable substrate 15 during transfer of substrate 15 onto the receiving article.

It should be appreciated that low density polyethylene, e.g., with density in range of 0.91–94 is partially (50 to 60%) crystalline with a solid melting point at about 115° C. (239° F.) (See F. Billmeyer, *Textbook of Polymer Science*, 2nd Ed. 1971, pp. 380–382). Low density polyethylene characteristically contains branched chains. High density polyethylene by contrast is essentially linear and is highly crystalline (over 90%) crystalline and has a density in the range of 0.95 to 0.97 and a melting point above 127° C. and typically about 135° C. (275° F). (See, F. Billmeyer, *Textbook of Polymer Science*, 2nd Ed. 1971, pp. 385–386).

The softening temperature of polyethylene, in general any polymer, is less than its melting point. The softening temperature (VICAT test, ASTM D1525) of low density polyethylene for example is about 88° C. to 100° C. (190° F. to 212° F.), medium density polyethylene about 99° C. to 124° C. (210° F. to 255° F.) and high density polyethylene about 112° C. to 132° C. (234° F. to 270° F.). *The Polymer Handbook*, 2nd Ed., J. Brandrup et al, 2nd edition, John Wiley & Sons, (1975) p. v-21. The above reported softening temperatures of a polyethylene were determined by the well known VICAT test (ASTM D1525) wherein an indentor under fixed load penetrates a specified distance into the material.

Applicant has observed that each grade of polyethylene, i.e., low, medium or high density polyethylene, exhibits a change in physical properties, i.e., a "softening effect" and accompanying increase in adhesiveness at temperatures which are somewhat below the VICAT softening temperature. Specifically, applicant has observed that high, medium and low density polyethylene each (and any blend thereof) exhibits a change in physical property and becomes tacky and adhesive as it is heated to temperatures between 200° F. to 230° F. and becomes even more tacky and adhesive at higher temperatures. Low density polyethylene begins to show a "softening effect" and increase in adhesion even at temperatures somewhat below 190° F.

Thus, softening effect of even high density polyethylene occurs at temperatures below the VICAT softening temperature and at least in the range between about 200° F. to 230° F. wherein the high density polyethylene becomes adhesive and tacky. Thus, the term "softening effect" as used herein shall include the range of temperatures somewhat below the VICAT temperature wherein the polyethylene exhibits said change in physical property, e.g., increase in adhesiveness or tack. The term "begins to soften" as well as the term "soften" as used herein and in the claims shall be construed to include the temperature wherein the above defined "softening effect" is first discernible by tactile observation or by standard ASTM laboratory tests for determination of increase in adhesiveness or tack of polymeric material.

Likewise in applicant's preferred system the lacquer coating transfer layer 20 has the property that during heat transfer at the typical platen temperatures between 300° F. to 425° F., transferable substrate 15 separates cleanly from the polyethylene release layer 5 without leaving behind on polyethylene release layer 5 any discernible portion of the lacquer coating release 20.

The heat transferable laminate of the invention satisfies a number of additional requirements simultaneously. The nonwax polyethylene release layer 5 is easily coated onto the support sheet 10 by conventional extrusion methods. Coating of the lacquer transfer layer 20, ink design layer 30 and the heat activatable adhesive layer 40 is readily accomplished in sequence by employing gravure methods, but other printing methods such as letter press, flexographic, or screen printing methods are also suitable.

Clean separation of the transfer coating 20 from the polyethylene layer 5 is achieved without leaving any discernible portion of either layer on the other when the heated platen or heated platen roller temperature is in the range between about 275° F. to 425° F., typically 300° F. to 425° F., and preferably 275° F. to 350° F. This is considered a surprising result.

A preferred embodiment of the release system of the invention, which is the combination of polyethylene release layer 5 in contact with lacquer transfer coating 20, has the important additional property that it fully eliminates the problem of wax "halo" around the border of the transferred design image, which problem has been long associated with wax based release formulation.

The problem of the wax halo effect is eliminated by the release system of the present invention since no discernible portion of the polyethylene release layer 5 remains adhered to transferable substrate 15 as the substrate 15 transfers onto the receiving article. This avoids a long-standing problem associated with wax base release layers which have a tendency to form a wax halo effect around the border of the transferred ink design image since a portion of the wax release transfers to the article along with the ink design.

Upon transfer the lacquer coating layer 20 forms a tough clear protective coating over the ink design layer 30 on the receiving article. The transferred protective coating 20 shows marked improvement in abrasion and scuff resistance than that which has heretofor been achieved by wax based release layers, for example, of the type described in U.S. Pat. No. 3,616,015.

The present release system of the invention provides a protective coating, namely coating layer 20 over the transferred ink design layer 30, having such marked improvement in abrasion resistance that if one were to attempt to scratch the surface with one's finger nails using moderate pressure no discernible scratch marks or abrasions would be left behind on the protective layer 20 covering ink design layer 30 on the article. This degree of abrasion resistance is quite difficult to achieve using a wax base release formulation even though improvements to wax base release formulation have been made. Although a wide range of plastic articles can be used as the receiving surface, especially good results are obtained with rigid relatively smooth plastic containers of any shape or curvature, typically flat, cylindrical, oval, tapered and various other shapes. These plastic articles may typically be high density polyethylene, polypropylene, polystyrene and polyvinylchloride, however, most other common plastics may be employed for the receiving article irrespective of whether they are thermoplastic or thermosetting.

The present invention has the added advantage that it does not require heat transfer operating temperatures which depart from conventional platen temperature between about 300° F. and 425° F. for transfer of design imprinted heat transferable laminates onto plastic articles. Additionally, in the present invention the platen temperature may be as low as about 275° F. Thus, the release system of the present invention may be employed with conventional decorator apparatus as, for example, eluded to in U.S. Pat. No. 3,616,015. When a wax based release system is used, post flaming is required. The nonwax base release system of the present invention additionally eliminates the requirement for post-flaming the lacquer transfer layer 20, i.e., the protective layer, after the transferable substrate 15 transfers onto the article.

Although post flaming can be employed to improve the durability of the transferred substrate 15 on the article, it is not required.

The elimination of the requirement of the post-flaming step is an additional improvement over the processing required when conventional wax base release layers, for example, as described in U.S. Pat. No. 3,616,015 are employed. Such wax base release layers typically require exposure to jets of hot gas either as direct gas flame or as hot air jets for a period of time sufficient to remelt the wax in order to improve the clarity, smoothness and glossiness of the wax based protective coating (formerly the release layer) after the transferable substrate has been transferred onto a receiving article. The elimination of the need for post-flaming is a direct result of the improved release system of the invention which does not employ any waxes in either the polyethylene release layer 5 or lacquer coating transfer layer 20.

With reference to the transferable laminate 7, shown in FIG. 1, the support sheet 10 is typically a paper sheet. It has been determined that it is preferable to use clay-coated paper for sheet 10. This type of paper is commercially available from most large scale paper companies. The clay-coated paper typically of 26 to 40 lbs/ream basis weight (3000 sq. ft/ream) provides a proper smooth barrier coating to prevent the polyethylene release layer 5 from being drawn into the paper and provides a smooth polyethylene surface at all times, including during the heat transfer process. Other dense, highly calendered papers with sufficient "holdout" having a similar basis weight typically of about 26 to 40 lbs/ream (3000 sq. ft/ream) could also be utilized.

In a preferred embodiment the release system is composed of the polyethylene layer 5, which is extruded onto the support sheet 10 and a lacquer coating transfer layer 20 which is coated over the polyethylene layer 5. It has been determined that each grade of polyethylene can be used in the context of the present invention, however, it has been found that preferred results are attained when high density or medium density grade polyethylene is employed. A high density of polyethylene release layer 5, which has been determined to give advantageous results in the context of the present invention, is one having a Sp. Gr. of 0.948 and a melt index of 11.0 gms per 10 min.

Although the present invention is not intended to be limited to basis weight of the polyethylene release layer 5, it has been found advantageous to extrude polyethylene of basis weight between about 10–15 lbs./ream (3,000 sq. ft. per ream) onto the support sheet 10. The polyethylene release layer of lower than about 10 lbs. per ream basis weight will tend to be unsuitable because there will be inadequate smoothness of the polyethylene layer for printing the design on it and insufficient film integrity during the heat transfer process. Polyethylene film of much greater than 15 lbs per ream would add needlessly to the cost of the laminate and also may interfere with the required rate of heat transfer to the polyethylene release layer 5 and the lacquer coating transfer layer 20. A typical high density polyethylene, for example, is one having a Sp. Gr. of 0.948 and melt index of 11.0 gm per 10 min (ASTM D-1238) and known VICAT softening temperature of about 121° C. The high density polyethylene is most preferred although medium density polyethylene as well as low density polyethylene may be used for release layer 5. The medium density grade however is more preferable than low density grade. Medium density grade polyethylene has a known VICAT softening temperature between about 99° C. to 124° C. (210° F. to 255° F.) and low density polyethylene typically has a VICAT softening point between about 88° C. to 100° C. (190° F. to 212° F.) It should be noted that a softening temperature of the most preferred polyethylene, namely high density polyethylene for release layer 5, has a VICAT softening temperature of 112° C. to 132° C. (234° F. to 270° F.) which is well below the low end of the hot platen operating temperature range between 300° F. and 450° F. as stated in the foregoing.

The lacquer coating transfer layer 20 which has been determined to produce all of the above stated results preferably does not contain any wax and is preferably composed of the combination of a polyester resin with relatively small amounts of a nondrying oil, preferably a nondrying vegetable oil of the castor oil type as classified in the *International Critical Tables,* Vol. 2, 1st Ed., 1927, page 201. The class of acceptable oils may be broadened to include, e.g., nondrying vegetable oils of the rape oil type as well as nondrying animal oils, both of these latter classes also recited in *International Critical Tables,* Vol. 2, 1927, at page 201. After transfer of the transferable substrate 15 to the receiving article, no discernible portion of the transfer layer 20 remains in contact with the nonwax release layer 5 and no discernible portion of the nonwax release layer 5 will be found in contact with the transfer layer 20.

The preferred class of oil that may be included in the formulation of the lacquer transfer layer 20 along with the polyester resin is a nondrying vegetable oil of the castor oil type. The preferred oil, which has been found to give the most advantageous results for use in the lacquer transfer layer 20 in combination with a polyester resin has been determined to be castor oil. Castor Oil itself is largely composed of glycerides of ricinoleic acid and glycerides of isoricinoleic acids and these glycerides thus may be substituted for the castor oil in the preferred formulations for the lacquer coating transfer layer 20 (Table 1). Nondrying vegetable oils of the rape oil type are believed suitable and may be substituted for castor oil as well. These oils typically contain glycerides of rapic acid and glycerides of erucic acids and thus these glycerides may be substituted for the castor oil for the preferred formulations for the lacquer coating transfer layer 20 (Table 1). It was found when the lacquer transfer layer 20 had as principal components a polyester resin with relatively small amounts of castor oil, preferably of AA USP refined grade, an unexpected result occurred when heat from a hot platen operating between about 275° F. to about 425° F. was applied to the heat transferable laminate 7 in contact with a receivng article. (A preferred castor oil is of AA USP refined grade having an acetyl value of 146 to 151 and saponification value of 175 to 183.)

As aforestated, it has been found that the polyethylene release layer 5 separates cleanly and instantly from the lacquer coating transfer layer 20 thus enabling the transferable substrate 15 to adhere to the receiving article, while the receiving article is simultaneously in contact with the exposed adhesive layer 40. It is not known with certainty why the present release system employing the preferred lacquer coating 20 having small amounts of nondrying oil present therein results in clean, instantaneous release of the polyethylene release layer 5 therefrom. The clean instantaneous release of the polyethylene release layer 5 from transferable substrate 15 is all the more surprising since it is known that polyethylene (even high density polyethylene) tends to "soften" and become more adhesive, and even tacky under application of hot platen operating temperatures typically between 300° F. and 425° F. and even at platen temperatures as low as about 275° F.

It is also theorized that the polyethylene release layer 5 which exhibits a "softening effect" and increase in tack at the moment of transfer of substrate 15 therefrom, in some yet not fully understood manner causes the lacquer transfer coating 20 to more uniformly conform to the surface of the receiving article. This results in clean, uniform transfer of lacquer transfer coating 20 without any air pockets being trapped between transfer substrate 15 and the surface of the receiving article. It is theorized that the softened polyethylene layer 5, at moment of transfer of substrate 15, helps transfer substrate 15 to be forced into tight surface conformity with even rough container surfaces.

It is postulated that because the polyethylene becomes sufficiently soft upon application of the platen roller to laminate 7, there is created a squeegee effect which expels air from the interface between the adhesive layer 40 and the article during transfer.

It will be appreciated that the lacquer coating transfer layer 20 employing polyester resin and nondrying oil preferrably of the castor oil type is initially coated typically by gravure methods onto the polyetheylene layer 5. The lacquer coating transfer layer 20 and similarly the ink design layer 30 and adhesive layer 40 are initially resin solids dissolved in solvents to form liquid mixtures so they can each in turn be coated by gravure or other conventional printing methods to form the heat transferable laminate 7.

After the lacquer coating, as above described, in solvent base is applied to the polyethylene layer 5, it is subjected to convective drying which is typically carried out at temperatures between about 175° F. to 225° F. by passing the coated substrate through a convective oven wherein it is exposed to forced hot air to drive off the solvent and form a tough dry coating layer. It will be appreciated that after the lacquer coating release layer 20 is applied and dried in this manner the ink design layer 30 is then applied and dried and in turn the adhesive layer 40 is then applied and dried in like fashion.

After the lacquer coating transfer layer 20 is dried, it is theorized that the castor oil molecules are held in uniformly dispersed form evenly throughout the dry lacquer coating 20. It is theorized that when a hot platen operating at conventional average surface temperatures between 275° F. to 425° F., typically 300° to 425° F. is applied to the exposed side of support sheet 10, the castor oil molecules immediately become activated and tend to migrate through the thickness of the lacquer coating layer 20. It is theorized that the oil molecules instantaneously migrate to the interfacial surface i between the lacquer coating transfer layer 20 and polyethylene release layer 5, thus instantly lubricating said interfacial surface i.

The mechanism is not fully understood, but it is theorized that when the oil molecules in lacquer coating 20 migrate to the interfacial surface i between layers 20 and 5 their lubricating effect promotes a clean release, that is a clean separation between the dried lacquer coating 20 and the polyethylene release layer 5. In the context of a preferred embodiment it is believed that even though the polyester or other resin binder, e.g., acrylic binder component, in lacquer coating 20 is, itself, somewhat incompatible with polyethylene layer 5, a clean release is more likely achieved under typical platen operating conditions between 300° F. to 425° F. if the nondrying oil is added to the lacquer formulation. The lubricating effect apparently accomplished by the migration of the aforementioned non drying oil molecules to interfacial surface i is sufficiently high and sufficiently instantaneous and uniform to overcome the increase in adhesiveness of the polyethylene layer 5 as the heated platen is applied to the exposed support sheet 10.

Preferred formulations for the nonwax release layer 5 and lacquer coating transfer layer 20 are illustrated in Table I.

TABLE I

| FORMULATION A | | A-1 Wt % | A-2 Wt % |
|---|---|---|---|
| NON WAX RELEASE LAYER (5) | | | |
| High Density Grade Polyethylene (e.g., Sp. Gr. 0.948 and Melt Index of 11.0 gms per 10 min (ASTM D-1238) | | 100 | 100 |
| | Total | 100 | 100 |
| LACQUER COATING TRANSFER LAYER (20) | | | |
| Resin Binder (Matrix) (e.g., Polyester VITEL PE-200) | | 29.0 | 29.0 |
| Castor Oil (AA U.S.P. refined grade) | | 0.7 | 1.5 |
| Solvents | | | |
| Toluene | | 7.0 | 7.0 |
| Methyl Ethyl Ketone | | 35.3 | 35.0 |
| Ethyl Acetate | | 28.0 | 27.5 |
| | Total | 100.0 | 100.0 |
| FORMULATION B | | B-1 WT % | B-2 WT % |
| NON WAX RELEASE LAYER (5) | | | |
| High Density Grade Polyethylene (e.g., Sp. Gr. 0.948 and Melt Index of 11.0 gms per 10 min (ASTM D-1238) | | 100 | 100 |
| | Total | 100 | 100 |
| LACQUER COATING TRANSFER LAYER (20) | | | |
| Resin Binder (Matrix) (e.g., Polyester VITEL PE-200) | | 26.5 | 25.0 |
| Castor Oil (AA USP refined grade) | 1.5 | 4.0 | |
| Polymeric Plasticizer (e.g., ESTANE 5715 thermoplastic polyurethane | | 1.0 | 0.5 |
| Toughening Agent (e.g., ELVACITE-2042 polyethylmethacrylate) | | 1.0 | 1.0 |
| Solvents | | | |
| Toluene | | 15.0 | 15.0 |
| Methyl Ethyl Ketone | | 45.0 | 44.5 |
| Ethyl Acetate | | 10.0 | 10.0 |
| | Total | 100.0 | 100.0 |

As may be seen from the formulations presented in Table I the preferred polyester resin is a saturated linear aromatic polyester, preferably a modified polyethylene terephthalate such as that available under the trademark VITEL PE-200. This particular polyester resin is manufactured and available from the Goodyear Chemical Company of Akron, Ohio. It will be noted that the preferred nondrying oil is castor oil, preferably AA USP refined grade which is readily available in the commercial market from Cas Chem Co., Bayonne, N.J. The VITEL resin and castor oil are admixed in a suitable solvent system as shown in each of the formulations in Table I. It will be noted that the castor oil need only be present in relatively very small quantities. It has been found that the castor oil per cent by weight of the dry transfer coating 20 (solvent free basis) should be between about 1.0 percent and about 15 percent by weight. It is thought surprising that the addition of nondrying oil, preferably of the castor oil type in the lacquer coating formulation 20 can promote the release effect between the polyethylene layer 5 and the predominantly polyester lacquer coating layer 20.

As may be seen from Table I, two preferred formulations using the VITEL polyester resins and castor oil lubricant are shown, namely formulations A and B. The formulation A illustrate two formulas with different per cent by weight castor oil which have been found to produce all of the above stated results in a commercial operation involving heat transfer, of heat transferable substrate 15 onto an article under platen operating temperatures of between about 275° F. to about 425° F..

Essentially the formulation A shows the combination of VITEL polyester and small amount of castor oil in conventional solvent system which includes toluene, methyl ethyl ketone and ethyl acetate which is any one of a number of solvent systems which can be employed to place the VITEL polyester and castor oil in homogeneous solution.

Formulation B shows similar formulation except that other commonplace resins have been added to the VITEL polyester and castor oil combination. These additional resins were added in small amounts and they include a polymeric plasticizer ESTANE-5715 which is a ketone or ester soluble elastomeric polyurethane resin available in the form of rubbery pellets from the B.F. Goodrich Company of Akron, Ohio. The formulation B also includes a small amount of a toughening agent such as an acrylic resin toughening agent, e.g., polyethylmethacrylate available under the tradename Elvacite 2042 from the E.I. DuPont deNemours Co., Wilmington, Del. The polyester resin VITEL - PE-200 functions primarily as a resin binder or matrix which holds the lacquer coating 20 together in a uniform cohesive coating. Although this polyester has been found to give preferred results in combination with the inclusion of a small amount of non-drying oil, e.g., of the castor oil or rape type, it has been determined that other resins such as acrylics, polyamides and vinyls which are known binders and are sufficiently incompatible with polyethylene may also be employed. However, a small amount of the nondrying oil such as the castor oil or rape oil type may be added to these resins to yield improved release properties during heat transfer.

Specifically, the acrylic resins found to be suitable for lacquer transfer layer 20 when release layer 5 is polyethylene are for example polymethylmethacrylate, polyethylmethacrylate and isobutylmethacrylate. The polyamides found to be suitable for lacquer transfer coating 20 when release layer 5 is polyethylene are soluble vinyls such as copolymers of polyvinylchloride and vinylacetate and homopolymers of polyvinylchloride. Other resins which can be used for the lacquer transfer coating 20 in the context of the present invention while employing polyethylene for release layer 5 are polyurethanes, polysulfones and fluorcarbons such as polyvinyldifluoride and fluorinated polyether.

The addition of a small amount of toughening agent, such as acrylic resin to the lacquer coating release 20, namely the addition of polyethyl-methacrylate resin causes an increase in the hardness of the dried lacquer release layer and from that standpoint is a desirable additive. The addition of a polymeric plasticizer such as ESTANE, which is a thermoplastic urethane elastomeric resin, causes an increase in flexibility to the dried lacquer coating release layer 20 to make the transferred layer 20 on the article somewhat less subject to cracking if the article is severly bent or distorted. The addition of a toughening agent such as a polyethylmethacrylate, e.g., Elvacite-2042 or a polymethylmethacrylate resin, and the addition of a polymeric plasticizer such as Estane resin are regarded as optional additions to the preferred formulation.

The formulations A and B shown in Table I are prepared under ambient conditions by simply blending the various components while stirring in a motor driven stirrer. It has been found advantageous to first blend the solvents by stirring at ambient temperature for about a minute or until the solution is homogeneous. The polyester VITEL PE-200 may then be added to the solvent mixture at ambient temperature and stirred, for example, for three to four hours using a motor driven mixer until the polyester particles completely dissolve in the solvent mixture forming a homogeneous solution. The non drying oil, e.g., castor oil, may then be added also at ambient temperature using a motor driven blender. The small amount of castor oil added to the formulation need only be blended for about 5 minutes until a homogeneous solution is achieved.

In the case of formulation B, it has been found desirable to add the polymeric plasticizer pellets at a step after the addition of the polyester VITEL. Then it was found desirable to add the toughening agent, e.g., acrylic resin Elvacite and continue blending at ambient temperature and then finally to add the castor oil last and continue blending until the homogeneous mixture containing all of the constituents of formulation B is achieved.

As above mentioned, the lacquer transfer coating 20, having the formulation shown in Table I, may be coated by gravure methods onto the polyethylene layer 5. It is then dried in conventional convective driers, e.g., by passing hot air over the coating at temperatures of between about 225° to 250° F. for one or two seconds or until the solvent in the lacquer coating has evaporated leaving the dried lacquer release layer 20 in contact with and adhered to the extruded polyethylene layer 5.

The ink design layer 30 and heat activatable adhesive layer 40 may be composed of conventional formulation known in the art for use in heat transferable laminates of this type. For example, the ink design layer 30 may be composed of any conventional ink of any color. The ink may typcially include resinous binder base compatible with the ink pigment employed. The ink binder may be selected from a wide variety of conventional resinous bases such as polyvinylchloride, acrylics, polyamides and nitrocellulose. The ink is applied also by a gravure coating methods or the like and then passed through convective ovens for one or two seconds in order to dry off solvents and leave a dried ink design layer 30 over the dried lacquer coating transfer layer 20.

It is advantageous in this technology to overlay ink design layer 30 with a heat activatable adhesive coating 40 which facilitates transfer of the transferable substrate 15 to the article to be decorated. The adhesive layer 40 becomes activatable on exposure to the heat from the hot platen in contact with the support sheet 10 during the transfer process. At the transfer temperature the components in adhesive layer 40 become tacky so that there is sufficient adhesion between the article being decorated and the transferable substrate 15 in contact therewith. Adhesive layer 40 is also applied in solvent base by gravure or other conventional coating methods and the solvent is driven off by exposing the coated layer to convective drying for one or two seconds or sufficient time to evaporate the solvent leaving the dry adhesive coating layer over the ink design layer 30. Adhesive layer 40 may suitably be composed of a thermoplastic polyamide adhesive, preferably a low temperature heat activatable polyamide adhesive.

A preferred theromoplastic polyamide resin for adhesive layer 40 is the reaction product of a diamine with a dimerized fatty acid such as that available under the tradename VERSAMID 900 Series, or preferably low temperature heat activatable VERSAMID adhesive from Henkel Corp. of Minneapolis, Minn. It has been found advantageous to combine this polyamide constituent with a nitrocellulose base in adhesive layer 40. This type of heat activatable adhesive for this particular application is known and documented in the prior art.

While it is advantageous to overlay ink design layer 30 with a separate heat activatable adhesive coating 40, it is a known and acceptable practice to include the heat activatable resin component, e.g., VERSAMID 900 polyamide or a low temperature heat activatable VERSAMID adhesive into the ink design layer itself. In this case, the adhesive layer 40 may be eliminated and the article to be decorated will contact the exposed ink design layer 30 directly.

In the process of applying heat transfer laminate 7 to an article such as a plastic bottle or container at least 60 such articles per minute may be decorated using the formulations for release layer 5 and lacquer coating transfer layer 20 as shown in Table I. It has been determined that with articles, typically plastic bottles, at least between about 60 to 120 articles per minute may be decorated using the formulations for release layer 5 and lacquer coating transfer layer 20 shown in Table I. In this process, as described in the foregoing, as heat from a hot metal platen or hot rubber platen roller is applied to the exposed side of support sheet 10 while the adhesive layer 40 of laminate 7 comes into contact with the bottle or article to be decorated, transferable substrate 15 separates cleanly from carrier web 2 and separates onto the article. At decoration speeds of between 60 to 120 bottles per minute the carrier web is in direct and intimate contact with the hot platen for at least about 0.25 seconds. At hot platen surface temperatures, which typically average between 300° F. to 425° F. and at decoration speeds at least between about 60 to 120 bottles per minute, and direct contact time between platen and laminate of at least about 0.25 seconds, the polyethylene release layer 5 has been measured by infrared pyrometer to have a temperature typically of about 250° F. Successful runs using the formulations shown in Table I have also been made at decoration speeds of at least about 60 to 120 bottles per minute with platen average surface temperatures as low as about 275° F. and direct contact time between platen and laminate of at least about 0.25 seconds. Under these latter conditions, i.e., platen average surface temperature of about 275° F., the temperature of the polyethylene layer 5 as measured with an infrared pyrometer may typically be about 230° F. In this preferred process the laminate 7 is first typically preheated to temperatures of between about 175° F. to 225° F. before it is contacted with the aforesaid hot metal platen or hot rubber platen roller. The preheat step is preferably accomplished by passing the laminate 7 over a heated metal surface so that the metal surface contacts the exposed side of support sheet 10 for sufficient time to achieve the desired laminate preheat temperature.

Although the invention has been described with the context of particular embodiments for the transferable laminate, the invention is not intended to be limited to the preferred formulations described herein. Although the lacquer transfer coating layer, for example, has been described with reference to preferred formulations including polyester resins as the principal binder together with a small amount of non-drying oil, preferably of the castor oil type, the formulation for the lacquer coating layer is not intended to be limited to these particular species of resin and oil respectively. As described in the specification, other binder resins, for example, acrylics, polyamides and vinyl resins may be used in the lacquer coating release formulation along with small amount of the non-drying oil of the castor oil or rape oil type to achieve the advantageous results described herein. Similarly, other species of non-drying oil as referenced in the foregoing description may be used to achieve the same or similar result described herein and therefore the present invention is intended to extend to these substitute materials as well. It should be appreciated that one may add trace or otherwise non-functional minor amounts of waxes to layers referenced herein as nonwax layers without being outside the scope of applicant's invention. Thus, the term "nonwax layer" or the equivalent as used in the foregoing description is intended to embrace this possibility.

The invention, therefore, is not intended to be limited to the description in the specification but rather is defined by the claims and equivalents thereof.

What is claim is:

1. A heat transferable laminate comprising a transfer substrate affixed to a carrier sheet for transfer from the carrier sheet to an article upon application of heat to the carrier sheet while said article contacts the transfer substrate, the carrier sheet comprising a support sheet and a non-wax release layer comprising polyethylene coated over said support sheet, the non-wax release layer being in contact with said transfer substrate, said transfer substrate comprising at transfer coating and an ink design over the transfer coating, the transfer coating being in contact with said non-wax release layer, said heat transfer laminate having the property that when a heat source is applied to the carrier for sufficient duration so that the non-wax release layer at least beings to soften while said transfer substrate contacts the article said transfer substrate separates cleanly from said non-wax release layer and transfers to said article, the heat transferable laminate having the additional property that no discernible portion of said non-wax release layer is transferred to the article along with said transfer substrate, the transfer coating of said transfer substrate comprising a polymeric resin and a non-drying oil.

2. A heat transferable laminate as in claim 1, wherein the non drying oil is a non drying vegetable oil selected from the group consisting of rape oil and caster oil.

3. A heat transferable laminate as in claim 1 wherein the non-drying oil is caster oil.

4. A heat transferable laminate as in claim 1 wherein the nondrying oil comprises a glyceride.

5. A heat transferable laminate as in claim 1 wherein the nondrying oil comprises a glyceride selected from the group consisting of glycerides of ricinoleic acid, rapic and erucic acids.

6. A heat transferable laminate as in claim 1 wherein the polymeric resin comprises a polyester resin.

7. A heat transferable laminate as in claim 1 wherein the polymeric resin comprises a saturated linear aromatic polyester.

8. A heat transferable laminate as in claim 1 wherein the non drying oil comprises between about 1.0 to 15 percent by weight of the transfer coating.

9. A heat transferable laminate as in claim 1 wherein the non-wax release layer consists essentially of polyethylene.

10. A heat transfer laminate as in claim 1 wherein the non-wax release layer coated over said support sheet comprises polyethylene selected from the group consisting of high density grade polyethylene and medium density grade polyethylene.

11. A heat transfer laminate as in claim 1 wherein the support sheet is paper.

12. A heat transfer laminate as in claim 1 wherein the oil in said transfer coating of the transfer substrate has the property that is becomes activated when heat is applied to the carrier sheet so as to promote the release of the transfer substrate from the carrier.

13. A heat transferable laminate as in claim 1 wherein said heat transfer laminate has the property that when a heated metal platen or heated rubber platen roller having a surface temperature between 275° F. and 425° F. is applied to the carrier for sufficient duration that the non-wax release layer at least begins to soften while said transfer substrate cleanly from said non-wax release layer and transfers to said article.

14. A heat transferable laminate as in claim 1 wherein said heat transfer laminate has the property that when a heated metal piston or heated rubber platen roller having a surface temperature between 300° F. and 425° F. is applied to the carrier for sufficient duration that the non-wax release layer at least begins to soften while said transfer substrate contacts the article said transfer substrate separates cleanly from said non-wax release layer and transfers to said article.

15. A heat transfer laminate as in claim 1 said transfer coating not comprising a wax.

16. A heat transferable laminate as in claim 15 wherein said laminate has the further property that no discernible portion of the transfer coating remains in contact with the nonwax release layer after the transfer substrate transfers to the article.

* * * * *